(12) United States Patent
Mabuchi

(10) Patent No.: US 7,639,296 B2
(45) Date of Patent: Dec. 29, 2009

(54) SOLID STATE IMAGING APPARATUS

(75) Inventor: Keiji Mabuchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 448 days.

(21) Appl. No.: 10/534,170

(22) PCT Filed: Nov. 5, 2003

(86) PCT No.: PCT/JP03/14115

§ 371 (c)(1), (2), (4) Date: May 5, 2005

(87) PCT Pub. No.: WO2004/045204

PCT Pub. Date: May 27, 2004

(65) Prior Publication Data

US 2006/0103748 A1  May 18, 2006

(30) Foreign Application Priority Data

Nov. 13, 2002  (JP) ............................. 2002-329727

(51) Int. Cl.
    *H04N 5/335* (2006.01)
(52) U.S. Cl. ........................ 348/308; 348/294
(58) Field of Classification Search ................ 348/308, 348/229, 230, 362, 294, 229.1, 295
    See application file for complete search history.

(56) References Cited

U.S. PATENT DOCUMENTS

| 6,400,824 | B1 * | 6/2002 | Mansoorian et al. | 380/269 |
| 6,606,122 | B1 * | 8/2003 | Shaw et al. | 348/302 |
| 6,847,398 | B1 * | 1/2005 | Fossum | 348/296 |
| 6,870,565 | B1 * | 3/2005 | Blerkom et al. | 348/294 |

(Continued)

FOREIGN PATENT DOCUMENTS

JP  02-65380  3/1990

(Continued)

OTHER PUBLICATIONS

Stuart Kleinfelder, "A 10kframe/s 0.18um CMOS Digital Pixel Sensor with Pixel-Level Memory", Feb. 5, 2001, 2001 IEEE International Solid State Circuits Conference Session 6.*

(Continued)

*Primary Examiner*—Lin Ye
*Assistant Examiner*—Amy Hsu
(74) *Attorney, Agent, or Firm*—Sonnenschein Nath & Rosenthal LLP

(57) ABSTRACT

AD conversion is rapidly carried out with a low load, and high-quality digital image signals are output by simultaneous AD conversion, without increasing the sizes of a pixel array and an optical system.

A pixel array (110) includes pixels (111) each including a photoelectric transducer and pixel transistors and outputs analog pixel signals. An AD memory (130) includes unit memories (131) in a two-dimensional array corresponding to a pixel arrangement in the pixel array (110), sequentially stores the analog pixel signals read through vertical signal lines, and carries out various types of processes, for example, AD conversion, fixed-pattern noise removal by CDS, and gain adjustment. AD converter circuits (132) are provided for the respective unit memories (131) in the AD memory (130). The AD converter circuits (132) convert the analog pixel signals read from the individual pixels to digital pixel signals.

10 Claims, 6 Drawing Sheets

U.S. PATENT DOCUMENTS

| | | | |
|---|---|---|---|
| 6,885,331 B2 * | 4/2005 | Krymski | 341/169 |
| 7,136,097 B1 * | 11/2006 | Toyoda et al. | 348/222.1 |
| 7,268,814 B1 * | 9/2007 | Pain et al. | 348/294 |

FOREIGN PATENT DOCUMENTS

| | | |
|---|---|---|
| JP | 05-048460 | 2/1993 |
| JP | 05-048460 A | 2/1993 |
| JP | 06-217203 | 8/1994 |
| JP | 06-217203 A | 8/1994 |
| JP | 11-298797 A | 10/1999 |
| JP | 11-341363 | 12/1999 |
| JP | 11-341363 A | 12/1999 |
| JP | 2001-024181 | 1/2001 |
| JP | 2001-45379 | 2/2001 |
| JP | 2001-045379 A | 2/2001 |
| JP | 2001-54022 | 2/2001 |
| JP | 2001-054022 A | 2/2001 |
| JP | 2001-339057 | 12/2001 |
| JP | 02-065380 A | 8/2009 |
| WO | WO 95/22180 | 8/1995 |

OTHER PUBLICATIONS

Japanese Office Action issued on May 24, 2007.
Japanese Office Action dated Jun. 26, 2008.
Japanese Patent Office, Office Action in Japanese patent application 2006-119649, dated Jun. 30, 2009.
Japanese Patent Office, Office Action in Japanese patent application 2007-189281, dated Jul. 1, 2009.

* cited by examiner

SOLID STATE IMAGING APPARATUS

TECHNICAL FIELD

The present invention relates to solid-state imaging apparatuses, for example, CMOS image sensors that include two-dimensional pixel arrays including pixels and that read signals from the pixels in the pixel arrays to process these signals.

BACKGROUND ART

In general, CMOS image sensors are fabricated in a MOS manufacturing process. Thus, unlike CCD image sensors, pixel arrays and AD converter circuits can be mounted on the same chip.

Three on-chip structures are known about AD converter circuits, as described below.

FIG. 6 is a schematic view illustrating a typical structure of a CMOS image sensor including such on-chip AD converter circuits. In FIG. 6, shaded blocks 200A, 200B, and 200C show three typical layouts of AD converter circuits. However, in practice, one of these layouts is adopted.

The structure of a known CMOS image sensor will now be described with reference to FIG. 6.

As shown in the drawing, this CMOS image sensor includes a pixel array 210, a vertical (V) selection circuit 220, column-signal processing units 230, a horizontal (H) selection circuit 240, and an output unit 250 on one chip.

The pixel array 210 includes many pixels in a two-dimensional array (a matrix).

The V selection circuit 220 sequentially selects the pixels in the pixel array 210 row by row in the vertical direction (the direction along columns) to drive the selected pixels.

The column-signal processing units 230 correspond to respective columns of the pixels in the pixel array 210 and sequentially receive signals from the individual pixels 211 to, for example, remove fixed-pattern noise and adjust gain.

The H selection circuit 240 sequentially selects the column-signal processing units 230 in the direction along rows to output the individual pixel signals processed in the column-signal processing units 230 to an output line 241.

The output unit 250 receives the pixel signals from the output line 241 and finally processes these signals to output the processed signals as image signals.

In such a CMOS image sensor, the following three types of structures including on-chip AD converter circuits are possible.

The shaded blocks 200A in FIG. 6 show a typical layout disclosed in, for example, U.S. Pat. No. 5,461,425. In this layout, one AD converter circuit is provided for each pixel 211 to carry out AD conversion for each pixel and to output a digitized pixel signal from the pixel 211 (hereinafter, referred to as pixel-level AD conversion).

The shaded blocks 200B in FIG. 6 show another typical layout disclosed in, for example, Japanese Patent No. 253234. In this layout, one AD converter circuit is provided for each of the column-signal processing units 230 to carry out AD conversion for each column and to output a digitized pixel signal from the column-signal processing unit 230 (hereinafter, referred to as column-level AD conversion).

The shaded blocks 200C in FIG. 6 show another typical layout. In this layout, one AD converter circuit is provided for the output unit 250 to carry out sequential AD conversion on the signals from the output line 241 and to output a digitized pixel signal from the output unit 250 to the exterior of the chip (hereinafter, referred to as chip-level AD conversion). This layout is equivalent to that of an AD converter circuit connected to a device outputting analog signals.

The three types of AD conversion described above have the following problems.

(1) The pixel-level AD conversion can be simultaneously carried out for all the pixels, thereby enabling high-speed processing. However, since one AD converter circuit is provided in each pixel, the size of the pixel is increased. As a result, the area of the pixel array and the size of an optical system are disadvantageously increased. On the other hand, the aperture ratio (the area ratio of a photodiode to a pixel) is decreased, so that the sensitivity is disadvantageously decreased.

(2) The pixels used in the column-level AD conversion have a simpler structure than those in the pixel-level AD conversion. Thus, the size of the pixels can be reduced. However, when one image frame is output, AD conversion must be carried out as many times as the number of rows (for example, several hundred to several thousand times), and thus the speed of the column-level AD conversion is disadvantageously low.

Moreover, since this AD conversion is carried out in a short time, the bandwidth of the circuit needs to be increased. Thus, the noise becomes large.

Moreover, since AD conversion of one frame is sequentially carried out row by row, the difference between the timing of AD conversion of the first row and that of the last row is one frame period. Thus, this AD conversion is not suitable when time shifting in a screen needs to be minimized (for example, when an image of an object that moves quickly is captured).

(3) The characteristics of the chip-level AD conversion are the same as those of the column-level AD conversion. That is, the pixels have a simple structure. However, when one image frame is output, AD conversion must be carried out as many times as the number of pixels (for example, several hundreds of thousand to several million times), and thus the speed of the chip-level AD conversion is even lower than that of the column-level AD conversion.

Moreover, since this AD conversion is carried out in a short time, the bandwidth of the circuit needs to be increased. Thus, the noise is even larger than that in the column-level AD conversion. Moreover, since AD conversion of pixel signals for one frame is sequentially carried out pixel by pixel, the difference between the timing of AD conversion of the first pixel and that of the last pixel is one frame period. Thus, this AD conversion is not suitable when time shifting in a screen needs to be minimized.

It is an object of the present invention to provide a solid-state imaging apparatus that can rapidly carry out AD conversion with a low load and that can output high-quality digital image signals by simultaneous AD conversion, without increasing the sizes of a pixel array and an optical system.

DISCLOSURE OF INVENTION

To achieve the object, a solid-state imaging apparatus according to the present invention includes a pixel array that includes a plurality of pixels in a two-dimensional array; an AD memory that includes a plurality of unit memories in a two-dimensional array corresponding to a pixel arrangement in the pixel array, each unit memory including an AD converter circuit; a pixel-array scanning circuit that scans the pixel array to read analog signals from the individual pixels to the AD memory; and a memory scanning circuit that scans the AD memory to output digital signals from the individual unit memories.

The solid-state imaging apparatus according to the present invention includes the AD converter circuits in the respective unit memories in the AD memory that corresponds to the two-dimensional pixel array, and carries out AD conversion on signals read from the individual pixels using the AD memory.

BEST MODE FOR CARRYING OUT THE INVENTION

A solid-state imaging apparatus according to an embodiment of the present invention will now be described.

Figure 1:
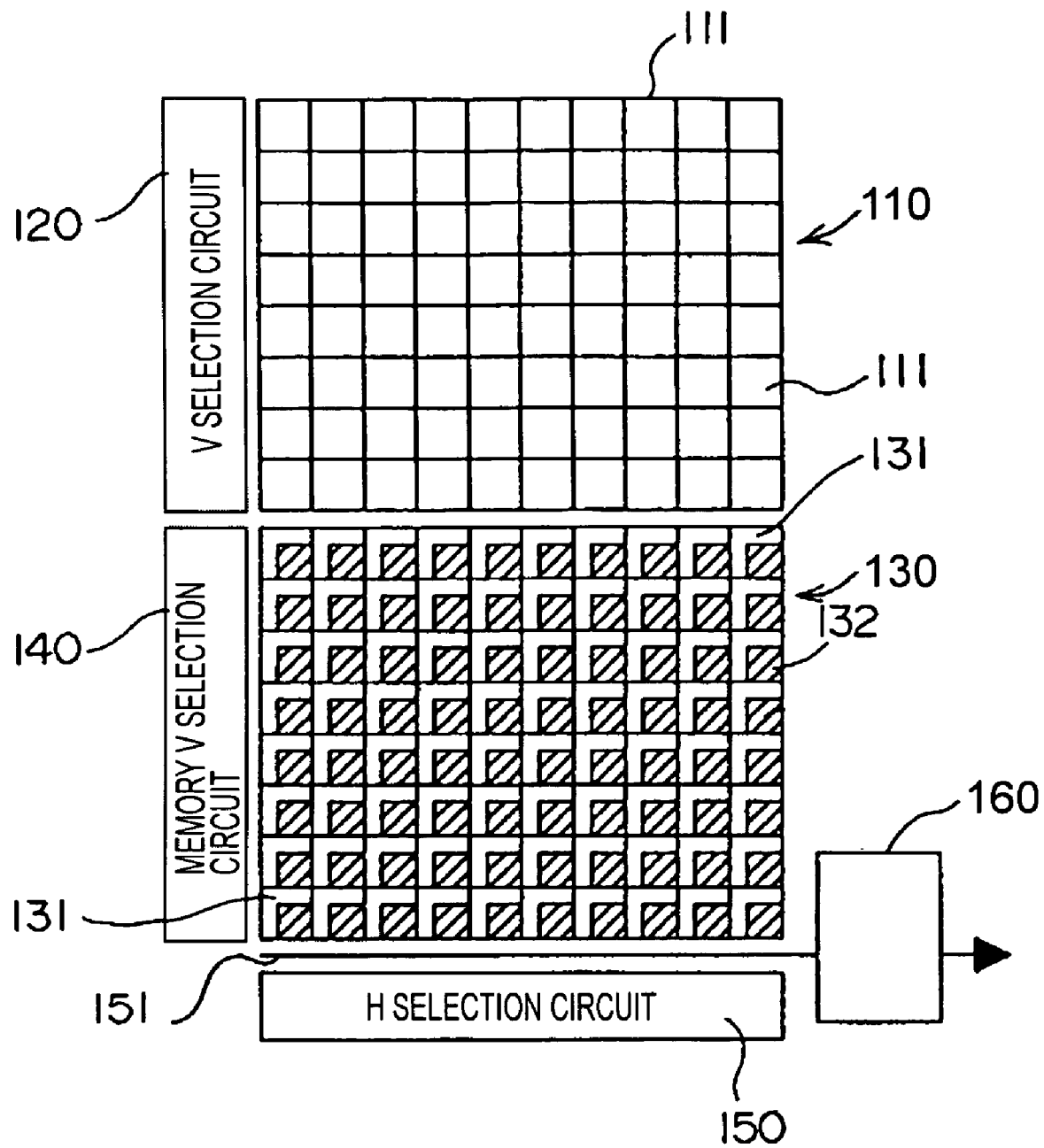
FIG. 1 is a schematic view illustrating the structure of a CMOS image sensor according to an embodiment of the present invention including on-chip AD converter circuits.

FIG. 1 is a schematic view illustrating the structure of a CMOS image sensor according to the embodiment of the present invention including on-chip AD converter circuits.

As shown in the drawing, this CMOS image sensor includes a pixel array 110, a V selection circuit 120, an AD memory (memory block) 130, a memory V selection circuit 140, an H selection circuit 150, and an output unit 160 on one chip.

The pixel array 110 includes many pixels 111 in a two-dimensional array (a matrix) and outputs analog pixel signals detected by the individual pixels through output signal lines (vertical signal lines) provided for individual pixel columns.

Each pixel 111 may have any type of circuit structure. For example, the pixel 111 includes a photoelectric transducer (for example, a photodiode), a transfer transistor that transfers signal charge generated at the photoelectric transducer to a floating diffusion (FD) part, an amplifying transistor that converts potential change due to the signal charge transferred to the FD part to an electrical signal and that outputs this electrical signal, a selecting transistor that connects the output of the amplifying transistor to the output signal lines (vertical signal lines), and a reset transistor that resets the potential in the FD part.

The V selection circuit 120 sequentially selects the pixels in the pixel array 110 row by row in the vertical direction (the direction along columns) to drive the selected pixels. The V selection circuit 120 constitutes a pixel-array scanning circuit.

The AD memory 130 includes unit memories 131 in a two-dimensional array. The unit memories 131 correspond to the pixels in the pixel array 110. The AD memory 130 sequentially stores the analog pixel signals read through the vertical signal lines to carry out various types of processes, for example, AD conversion, fixed-pattern noise removal by CDS, and gain adjustment. The unit memories 131 are composed of DRAMs.

AD converter circuits 132 are provided for the respective unit memories 131 in the AD memory 130 to convert the analog pixel signal read from the individual pixels to digital pixel signals.

In the structure shown in FIG. 1, the pixels 111 in the pixel array 110 correspond to the unit memories 131 in the AD memory 130 in a one-to-one relationship. Alternatively, a plurality of pixels may correspond to one unit memory in an N-to-one relationship ($N \geq 2$). In this arrangement, one unit memory sequentially processes a plurality (N) of pixels. When the unit memories 131 are disposed in an array having as many columns as the pixel array 110 and at least two rows, simultaneous AD conversion of signals from all the pixels in one screen can be carried out. Thus, the time required for the AD conversion is less than those in the known imaging apparatuses described above.

Figure 2:
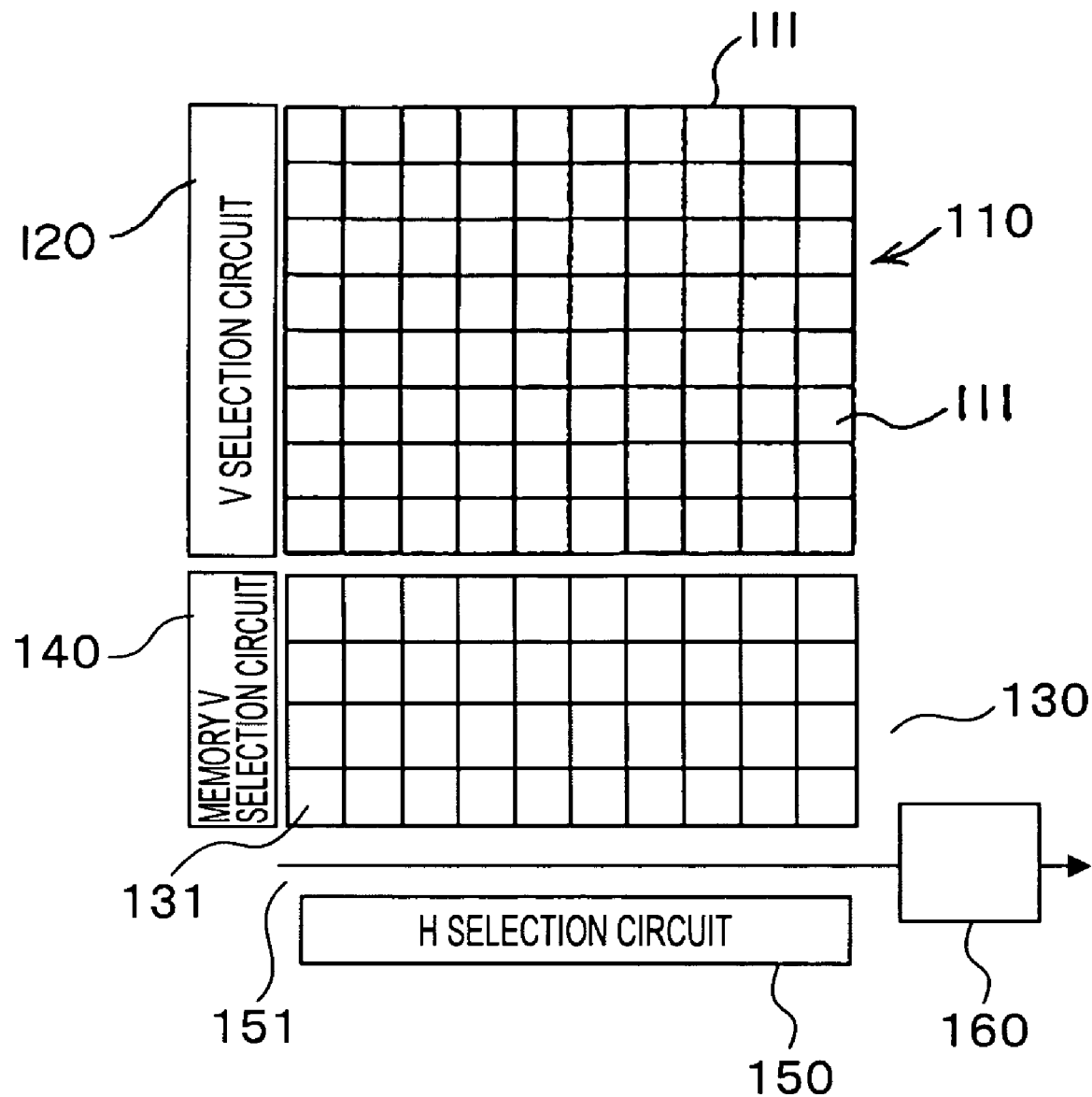
FIG. 2 is a schematic view illustrating AD converter circuits in another embodiment.

For example, when the AD memory includes half as many rows as the pixel array as shown in FIG. 2, simultaneous AD conversion is alternately carried out on signals from one half of all the pixels. Thereby, the time required for AD conversion of signals from all the pixels in a screen can be reduced.

When signals are read at an accelerated rate to carry out high-speed image capturing at a low resolution, the time required for AD conversion of signals of one frame can be drastically reduced, thereby facilitating high-speed image capturing. In the solid-state imaging apparatus shown in FIG. 2, for example, when signals from pixels in two sequential rows are combined to be read, the AD memory can carry out simultaneous AD conversion of signals from pixels in one frame. Moreover, for example, when the number of rows to be combined is increased or when the number of rows included in the AD memory having the structure other than that shown in FIG. 2 is less than one half of that in the pixel array and is at least two, AD conversion can be carried out in the same manner.

In this embodiment, the unit memories in the AD memory 130 are in an array so as to correspond to one image frame, and AD conversion is carried out for one frame. Thus, this AD conversion is referred to as frame-memory level AD conversion.

The memory V selection circuit 140 scans and drives the individual unit memories 131 in the AD memory 130 to output digital pixel signals processed in the individual unit memories 131.

The H selection circuit 150 sequentially selects the AD memory 130 in the direction along rows to output the digital pixel signals processed in the AD memory 130 to an output line 151. The memory V selection circuit 140 and the H selection circuit 150 constitute a memory-scanning circuit.

The output unit 160 receives the digital pixel signals from the output line 151 and finally processes these signals to output the processed signals to the exterior of the chip as digital image signals.

In the frame-memory level AD conversion according to this embodiment, the pixel signals from the pixel array 110 can be transferred to the AD memory 130 in a short time, and simultaneous AD conversion can be then carried out on signals from all the pixels. Thus, unlike known pixel-level AD conversion, the size of each pixel is not increased because the pixel has no AD converter circuit, or the aperture ratio is not decreased. Furthermore, unlike the column-level AD conversion and the chip-level AD conversion, only a single AD conversion is required for one frame, thereby enabling high-speed processing. Moreover, each AD conversion can be carried out at a low rate. Thus, the bandwidth of the AD converter circuit can be decreased to reduce the noise.

Figure 3:
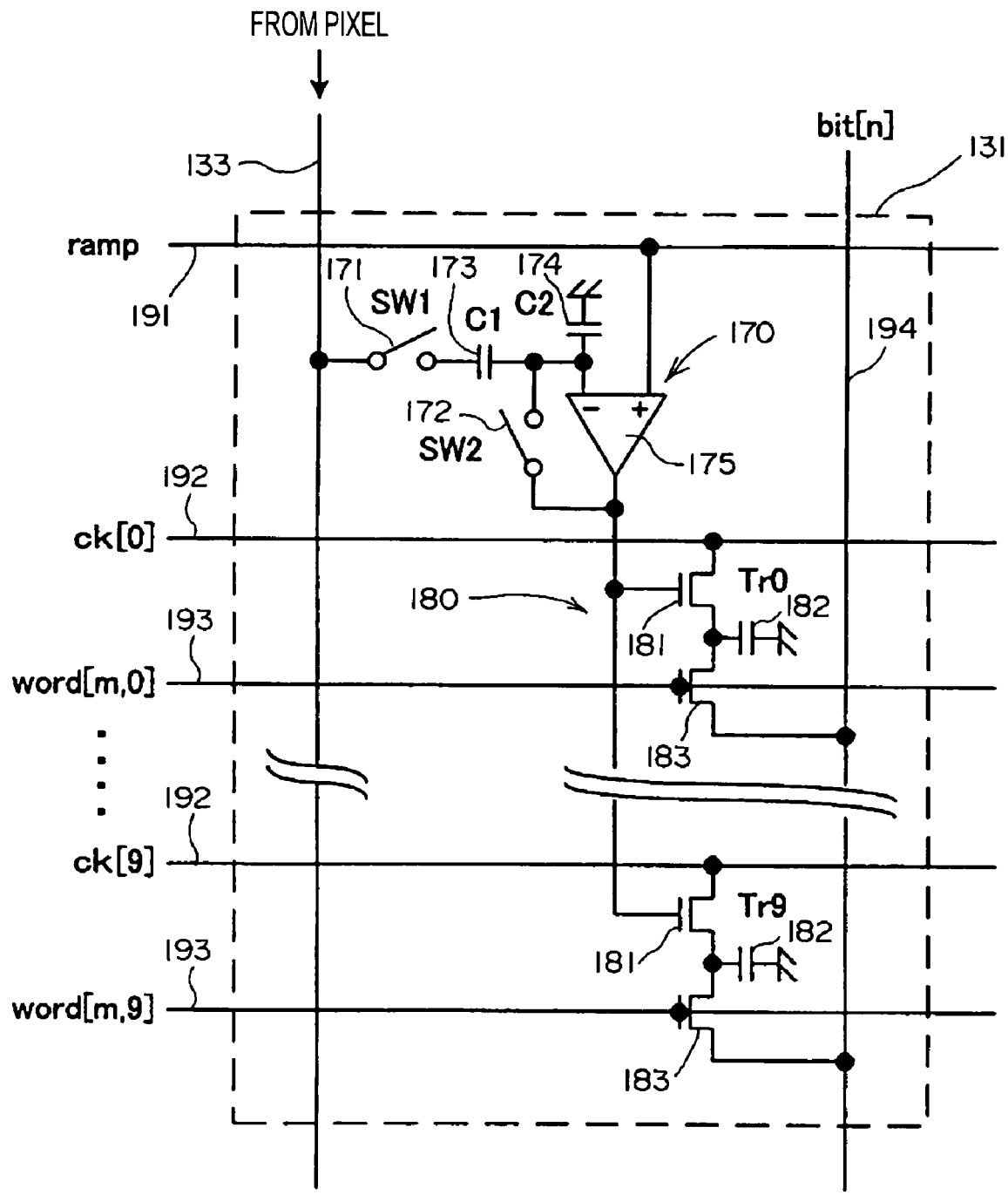
FIG. 3 is a circuit diagram illustrating typical circuits in one unit memory in an AD memory shown in FIG. 1.
Figure 4:
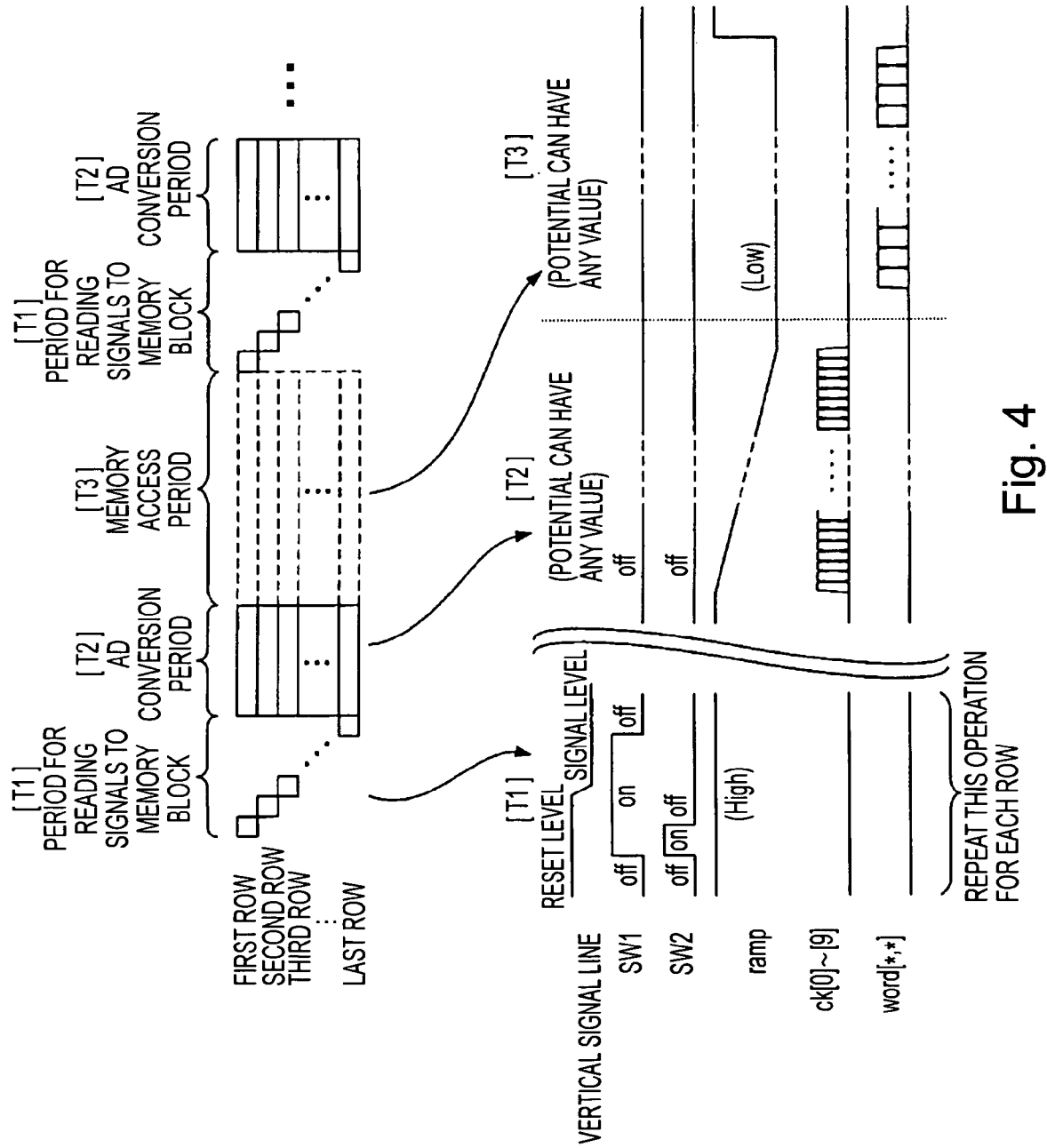
FIG. 4 is a timing chart illustrating a typical operation of the AD memory shown in FIG. 1.

FIG. 3 is a circuit diagram illustrating typical circuits in one unit memory 131 in the AD memory 130 according to this embodiment. FIG. 4 is a timing chart illustrating a typical operation in the AD memory 130 according to this embodiment.

The structure of one unit memory 131 will now be described with reference to FIG. 3.

The unit memory 131 includes a correlated double sampling (CDS) circuit 170 that detects the difference between a reset-level voltage and a signal-level voltage from each pixel through one vertical signal line 133 and that removes fixed-pattern noise generated in the pixel. The unit memory 131 further includes an AD converter circuit 180 (that is, corresponding to the AD converter circuits 132 shown in FIG. 1) that compares the differential signal generated in the CDS circuit 170 with a ramp pulse to output a digital signal value. In this embodiment, the pixel circuit outputs the reset-level voltage corresponding to a zero-level voltage and the signal-level voltage less than the reset-level voltage.

As shown in FIG. 3, the CDS circuit 170 includes switches (SW1 and SW2) 171 and 172, capacitors (C1 and C2) 173 and 174, and a differential amplifier 175.

The AD converter circuit 180 in the illustration has a 10-bit data width. Each bit includes a converting transistor (Tr0 to Tr9) 181, a sampling capacitor 182, and an outputting transistor 183.

The operation of the AD memory 130 will now be described with reference to FIG. 4. In waveform charts in FIG. 4, a ramp voltage is analog and is shown in a different scale from other scales used for other signals.

(1) Period for reading signals from the pixel array 110 to the AD memory (memory block) 130 [T1]

Signals are read from the pixel array 110 row by row and are written to the unit memories 131 in the AD memory 130. The unit memories 131 correspond to the respective pixels.

The operation for each row is as follows:

(1-1) First, the switches 171 and 172 are turned on while the reset-level voltage is output from each pixel 111 through the vertical signal line 133.

The potential of the capacitor 173 at a portion close to the switch 171 is set to the reset level. On the other hand, at the place on the opposite side of the capacitor 173 from this portion, a ramp voltage is applied to the positive (+) input terminal of the differential amplifier 175 through a ramp-signal supply line (ramp wiring line) 191. Thus, when the switch 172 is turned on, the voltage across the negative (−) input terminal and the output terminal of the differential amplifier 175 is clamped to the ramp voltage.

(1-2) Then, the switch 172 is turned off, and the signal-level voltage is output from each pixel through the vertical signal line 133. At this time, the potential at the negative (−) input terminal of the differential amplifier 175 changes through the capacitor 173 in the negative direction in proportion to the difference between the reset-level voltage and the signal-level voltage. That is, a signal voltage free from fixed-pattern noise in the pixel is input to the negative (−) input terminal.

As a result, the output of the differential amplifier 175 increases to the "High" level, and the transistor 181 is turned on.

(1-3) When the switch 171 is turned off at this timing, the vertical signal line 133 is disconnected from the circuits, and this status is maintained.

During this period, the ramp signal is at the "High" level. Voltages at both a clock wiring line (ck wiring line) 192 for driving the transistor 181 and a clock wiring line (word wiring line) 193 for driving the transistor 183 are at the "Low" level.

The operation described above will be repeated for all rows to read signals of one frame into the AD memory.

(2) AD Conversion period [T2]

Next, clocks ck[0] to ck[9] for driving the transistors 181 count up using 10 bits while the ramp voltage is changed from the "High" level to the "Low" level. When the ramp voltage falls below the voltage at the negative (−) input terminal of the differential amplifier 175 that is maintained in period (1), the output of the differential amplifier 175 is inverted, and values ("High"/"Low") of the clocks ck[0] to ck[9], that is, the results of AD conversion using 10 bits, at this time are stored in the respective capacitors 182.

In this embodiment, since the ramp voltage and the clocks ck[0] to ck[9] are common across the AD memory, AD conversion is simultaneously carried out on all signals of one frame. The capacitors 182 each store a value "High" or "Low", and thus function as a DRAM.

(3) Memory access period [T3]

Next, the word wiring lines 193 for the transistors 183 are driven to read signals from intended pixels in the AD memory through bit wiring lines 194 serving as data output lines. The circuits and the method for reading signals may be the same as those of a regular DRAM. Signals may be sequentially read from the AD memory row by row, may be read from a portion of the AD memory, or may be read from the AD memory at random.

To read data of the next frame, the operation described above, starting from the read operation in period (1), is similarly carried out. The read operation in period (1) is carried out row by row. Thus, even during this period for reading signals from the pixel array to the AD memory, rows that are not currently subjected to the reading operation in the AD memory can be accessed. The operation described above will be repeated.

In the known CMOS image sensor including no frame memory, even when signals of one row are simultaneously read to the column-signal processing units, the column-signal processing units of respective columns are sequentially selected to output the signals to a horizontal signal line. The time required for the signal-outputting operation of one row is several to several ten times that for the signal-reading operation of one row. The next row cannot be read until this sequential process completes.

In contrast, according to the method of this embodiment, one reading cycle for one row completes at the completion of reading signals of one row to the AD memory 130. Thus, the time required for one reading cycle for one row is several tenths to several hundredths of that in a known CMOS image sensor. This means that the time difference in reading rows is decreased. Thus, time shifting in a screen can be reduced by a factor of several to several tens. When an image of a moving object is captured, this time shifting causes deformation in an image of the object. According to the method of this embodiment, the deformation can be reduced by a factor of several to several tens. In this embodiment, since signals are read from the pixels in a method used in the known CMOS image sensor, a known method for suppressing deformation in an image by exposure-time synchronization can be applied to this embodiment, as in the known CMOS image sensor.

Moreover, according to the method of this embodiment, AD conversion is simultaneously carried out on all signals of one frame, and thus is completed in a short time.

Moreover, since frame memories are accessed when signals are read from the AD memory 130, the read operation need not be carried out in row sequence, but can be carried out in any sequence. Moreover, other signals from the exterior of the AD memory 130 can be written to the AD memory 130 through the word lines and the bit lines, as in a regular DRAM.

Moreover, electronic shuttering can be carried out by resetting the pixels at a predetermined timing before signals are read from the pixels, as in the known CMOS image sensor.

In the embodiment described above, the pixel circuit outputs the reset-level voltage (a voltage corresponding to signal zero) and the signal-level voltage less than the reset-level voltage. Alternatively, other types of pixel circuit may be used.

Moreover, the AD memory may have structures other than that described above. For example, one AD converter circuit may be assigned to a plurality of pixels.

Moreover, the AD converter circuit may be a chopper-type comparator or a delta-sigma ($\Delta\Sigma$) type AD converter. Moreover, for example, SRAM-type memories may be used instead of the DRAM-type.

Figure 5:
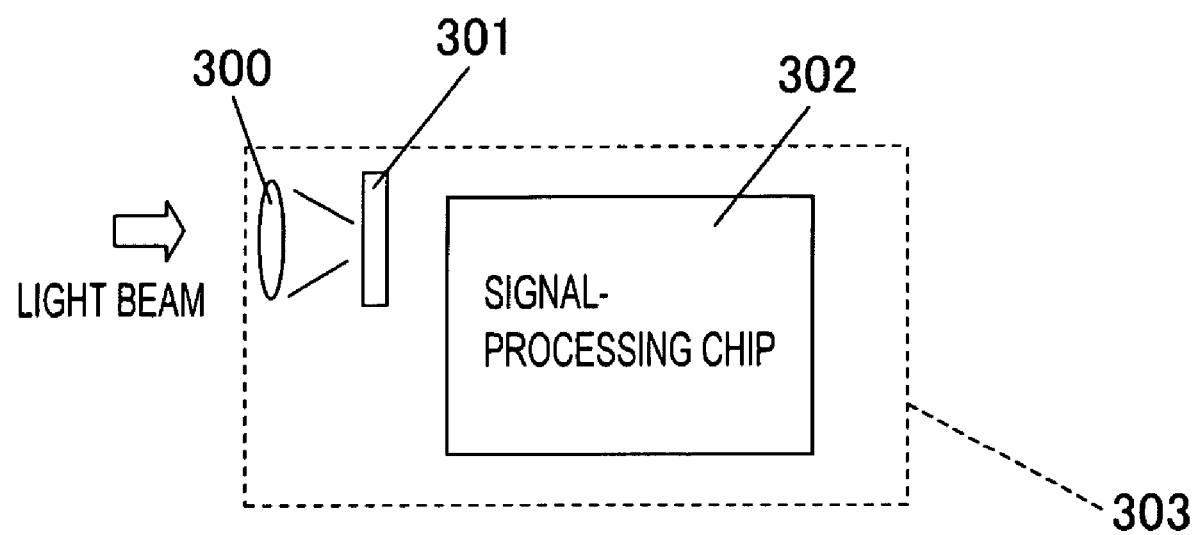
FIG. 5 is a schematic view illustrating a camera-module-type solid-state imaging apparatus according to another embodiment of the present invention.
Figure 6:
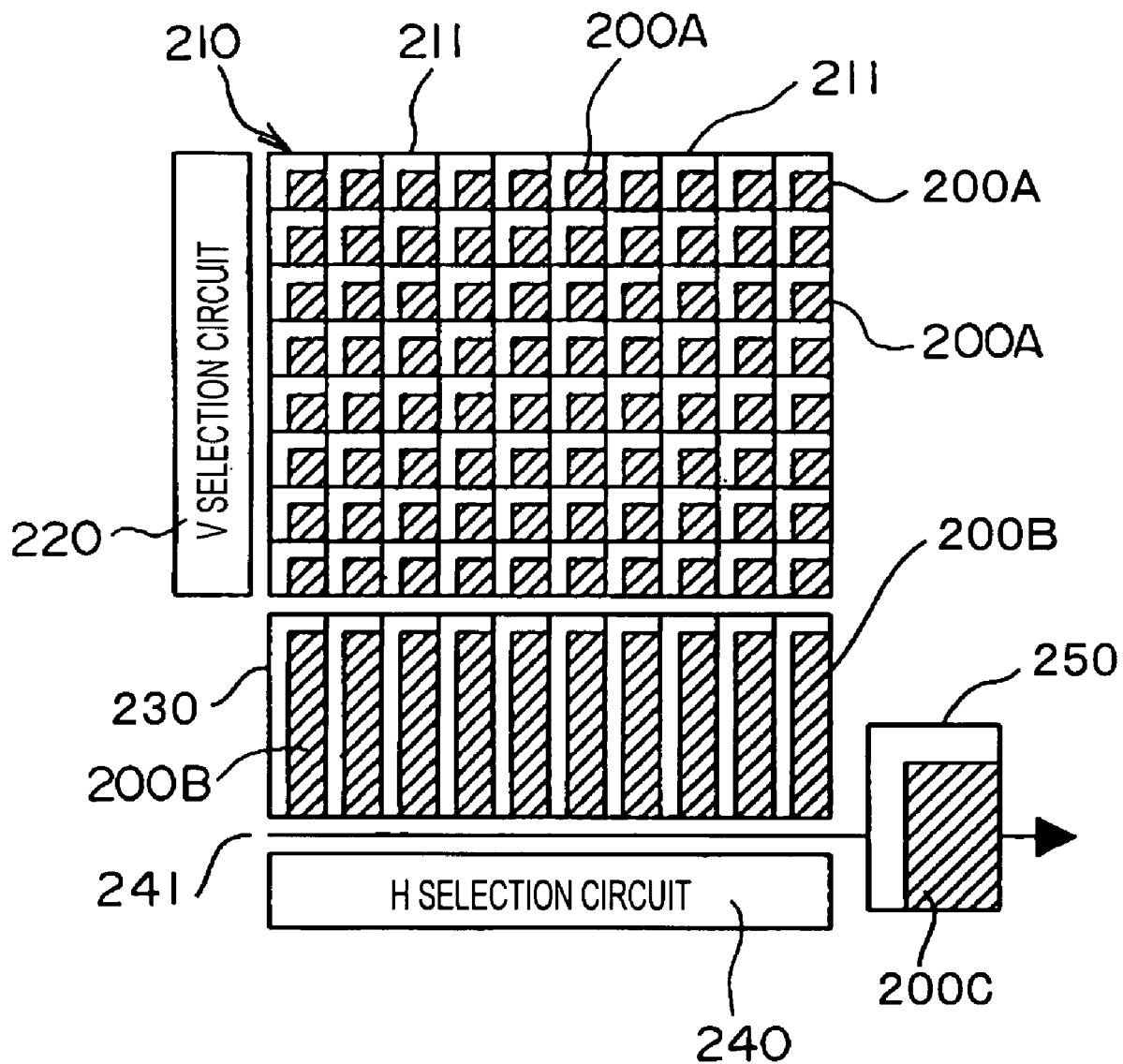
FIG. 6 is a schematic view illustrating a typical structure of a known CMOS image sensor including on-chip AD converter circuits.

The solid-state imaging apparatus according to the present invention may include elements other than those described above. For example, a camera-module-type solid-state imaging apparatus 303 includes an optical system 300, an imaging unit 301, and a signal-processing chip 302, as shown in FIG. 5.

Moreover, the rows and the columns in the two-dimensional arrangement in the pixel array and the AD memory are not substantially distinct from each other. At least, the pixels and the unit memories are disposed in two directions intersecting at an angle close to a right angle. In this arrangement, depending on the way of viewing the solid-state imaging apparatus, pixel rows can be viewed as pixel columns and vice versa, and unit-memory rows can be viewed as unit-memory columns and vice versa.

INDUSTRIAL APPLICABILITY

As described above, in the solid-state imaging apparatus according to the present invention, the AD converter circuits are provided for the respective unit memories in the AD memory that corresponds to the two-dimensional pixel array. Since these AD converter circuits carry out AD conversion on signals read from the respective pixels, AD conversion can be carried out as distributed processing among the AD converter circuits disposed in an array. Thus, the total rate of this AD conversion is higher than those of the column-level AD conversion and the chip-level AD conversion described above. Moreover, the bandwidth of each AD converter circuit can be reduced to obtain signals that are substantially free from the noise.

Moreover, since the AD converter circuit is not provided in each pixel, the structure of the pixel circuit can be simplified, and the aperture ratio of the pixel can be increased to increase the sensitivity of the pixel array. Moreover, since pixel signal can be read from the pixel array to the AD memory in a short time, time shifting in processing a screen can be reduced. Thus, even when an image of a moving object is captured, a high-quality image that is substantially free from deformation can be achieved.

Moreover, since the frame memories are accessed when signals are read from the AD memory, the read operation need not be carried out in row sequence, but can be carried out in any sequence. Moreover, other signals from the exterior of the AD memory can be written to the AD memory through the word lines and the bit lines, as in a regular DRAM.

The invention claimed is:

1. A solid-state imaging apparatus comprising:
a pixel array, said pixel array comprising a plurality of pixels in a two-dimensional array;
a pixel-array scanning circuit that scans the pixel array to read analog signals from the individual pixels and outputs said analog signals to an AD (analog to digital) memory, wherein
the AD memory is separate from the pixel array and comprises a plurality of unit memories in a two-dimensional array corresponding to a pixel arrangement in the pixel array,
each unit memory stores a respective analog signal from a corresponding individual pixel and includes an analog to digital converter circuit, and
each said analog to digital converter circuit produces a converted digital signal by carrying out analog to digital conversion on a stored analog signal; and
a memory scanning circuit for scanning the AD memory and outputting the converted digital signals from the individual unit memories.

2. The solid-state imaging apparatus according to claim 1, further comprising an output unit that processes the digital signals output from the memory scanning circuit and outputs the processed signals out of the apparatus.

3. The solid-state imaging apparatus according to claim 1, wherein the individual pixels in the pixel array correspond to the individual unit memories in the AD memory in a one-to-one relationship.

4. The solid-state imaging apparatus according to claim 1, wherein the individual pixels in the pixel array correspond to the individual unit memories in the AD memory in an N-to-one relationship wherein $N \geq 2$.

5. The solid-state imaging apparatus according to claim 1, wherein AD conversion is simultaneously carried out for all the unit memories in the AD memory.

6. The solid-state imaging apparatus according to claim 1, wherein the signals are read from the pixel array to the AD memory pixel row by pixel row, and AD conversion is simultaneously carried out for all the unit memories in the AD memory.

7. The solid-state imaging apparatus according to claim 1, wherein the unit memories comprise DRAMs.

8. A solid-state imaging apparatus comprising:
a pixel array, said pixel array comprising a plurality of pixels in a two-dimensional array; and
an AD (analog to digital) memory, separate from said pixel array, for storing analog signals read from the pixel array and carrying out AD conversion on said analog signals, the AD memory comprising a plurality of unit memories in a two-dimensional array corresponding to a pixel arrangement in the pixel array, each unit memory including an analog to digital converter circuit, and the plurality of unit memories carrying out AD conversion on signals from at least two rows of pixels simultaneously.

9. The solid-state imaging apparatus according to claim 8, wherein the plurality of unit memories simultaneously AD convert signals that are obtained by combining signals read from the pixel array.

10. The solid-state imaging apparatus according to claim 8, wherein the unit memories carry out noise removal and AD convert the signals from the pixel array.

* * * * *